United States Patent

[11] 3,633,933

[72] Inventor Barry John Millard
     Earley, Near Reading, England
[21] Appl. No. 7,685
[22] Filed Feb. 2, 1970
[45] Patented Jan. 11, 1972
[73] Assignee Adwest Engineering Limited

[54] STEERING MECHANISM FOR MOTOR VEHICLES
     10 Claims, 6 Drawing Figs.
[52] U.S. Cl. .................................................. 280/96,
                                                    74/422, 74/498
[51] Int. Cl. ................................................. B62d 3/12
[50] Field of Search ........................................ 280/96, 87,
     91; 180/79.2; 74/498, 499, 500, 33, 29, 422, 424.6

[56] References Cited
           UNITED STATES PATENTS
1,872,714  8/1932  Farley ........................... 180/79.2
2,859,628  11/1958 Arko .............................. 74/33
3,279,813  10/1966 Linsay .......................... 280/91
3,298,708  1/1967  Cadiou .......................... 280/96
           FOREIGN PATENTS
451,813    8/1936  Great Britain ................. 180/45
552,300    11/1956 Italy ............................. 280/96
1,194,066  5/1959  France .......................... 280/96
1,933,402  1/1970  Germany ....................... 280/96

Primary Examiner—Kenneth H. Betts
Attorney—Larson, Taylor & Hinds

ABSTRACT: A motor vehicle steering mechanism having a first toothed rack with at least one end connectable to two steerable road wheels of the vehicle. A first pinion engages the teeth of this rack. There is a second toothed rack with a second pinion engaging its teeth. A transmission connects together the first and second pinion and a third pinion engaging the teeth of the second toothed rack is mounted on an input member. The first rack and the steerable wheels are thus controlled from the input member.

STEERING MECHANISM FOR MOTOR VEHICLES

BACKGROUND OF THE INVENTION

This invention relates to steering mechanism for motor vehicles or automobiles and more particularly to rack and pinion-steering mechanism. The invention is applicable to both manually operated steering mechanism and to power assisted steering mechanism.

An aim of the present invention is to provide a steering mechanism which will reduce packaging problems encountered in designing a steering mechanism to fit into a particular vehicle.

The steering mechanism of the present invention will also allow a rack and pinion-steering mechanism to be employed where relatively large steering forces are encountered, as, for example, in commercial vehicles.

OBJECTS OF THE INVENTION

According to the present invention there is provided, a motor vehicle steering mechanism comprising a first toothed rack having at least one of its ends connected, or adapted to be connected, to two steerable road wheels of a motor vehicle, and a first pinion engaging the teeth of the first rack and turnable from an input member such as a steering wheel, characterized in that there is provided a second toothed rack, a second pinion engaging the teeth of the second toothed rack, a transmission connecting together said first and second pinions, and a third pinion engaging the teeth of the second toothed rack and connected to said input member.

Thus, in operation, the input member, which may be a steering wheel or the like, of the vehicle in which the mechanism is incorporated transmits motion to the third pinion and thereby moves the second toothed rack. The motion of the second toothed rack is transmitted via the second and first pinions and the transmission there between to the first rack and thence to the steerable road wheels.

The principal object of the invention is to provide a steering mechanism in which the two toothed racks, associated toothed pinions and transmission can assume a wide variety of dispositions within vehicles. Thus, the fitting or "packaging" of the steering mechanism within a particular type of vehicle is rendered more easy by selecting the most appropriate one of the available dispositions of the various parts of the steering mechanism.

Another object is to provide a steering mechanism in which the conventional direct shaft extending between the steerable wheels and the driver is eliminated; thus, the position of the steering mechanism can be arranged to provide safety for the driver from crash impact. Thus, an expanded metal or similar column arrangement or shear bolts can be provided behind the steering wheel to give impact energy absorption for the driver contacting the steering wheel.

A further object is to provide a steering mechanism in which; the actual steering rack can be mounted directly on the vehicle axle and thus be connected almost directly to the steerable road wheels, thus eliminating or minimizing lack of response and wheel "fight" which occurs where the positioning of the rack necessitates a relatively complicated and long linkage to the road wheels.

Another object is to provide a steering mechanism in which the limitation in the steering ratio obtainable with a conventional single rack in the kind of vehicle to which rack and pinion steering could be applied is avoided in the present invention since the pinion of the second rack and the ability to select the gear ratios of the second and third pinions means that any desired steering ratio can be provided.

Another object is to provide a steering mechanism which may if desired, operate on one steerable road wheel only, the track being maintained by a conventional track rod.

A further object is to provide a steering mechanism which may be fitted in a motor vehicle which has a rigid front axle fitted with steerable road wheels at its ends, the first rack being mounted directly on the front axle.

Another object is to provide a steering mechanism in which power assistance means may be provided e.g., the first rack is provided with power assistance means; such as a hydraulic piston and cylinder unit. The power assistance may be provided integrally with the rack unit either on the same axis as the rack or in tandem with the rack axis with extension pieces, or completely separate. In any event, a rotary control valve can be provided on any rotatable shaft with the system.

A further object is to provide a steering mechanism which may be fitted in a motor vehicle which has independent front suspension.

Another object is to provide a steering mechanism in which the first rack may be mounted to one or more rigid axles with the first pinion on the longitudinal center of the vehicle or axle, the position of the rack in relation to the axle being in the optimum position for the individual vehicle concerned.

Moreover, the pinion and toothed racks may be of appropriate different shapes and/or size to provide the requisite dispositions of these parts within a vehicle. Thus, the first rack may be conveniently mounted directly on a vehicle axle and parallel to it, although there is no limitation in this respect. Moreover, the second rack may lie substantially parallel to the first rack, but again, there is no limitation in this respect. However, the racks may have any appropriate relative disposition, the teeth of the pinions being of normal or spiral or helical or other appropriate form, and/or the transmission being of such form as to accept the relative disposition of the two racks and also to provide for a variety of positions of the steering wheel within the vehicle and the attitude to the driver.

As to the transmission, this may be constituted by a coupling shaft upon the opposite ends of which the first and second pinions are mounted. The coupling shaft may be split into two sections and includes a universal joint and/or a sliding joint, or a combined sliding and universal joint. In any event the input member will usually include a steering wheel.

The provision, in accordance with the invention, of two toothed racks and three toothed pinions provides a wide range of steering ratios. Thus, other ratios can be simply determined by appropriate choice of the relative diameters and number of teeth of the various pinions.

The various pinions may be of different diameters, i.e., have different numbers of teeth, to provide any desired steering ratio. Thus, the third pinion may have fewer teeth than the second pinion so as to increase the steering ratio of the steering arrangement for example to give a gear ratio of 3:1.

The third pinion connected to the steering wheel is as small as can be provided consistent with the strength necessary to resist forces applied by the driver.

The first pinion is ideally as small as possible consistent with strength.

The pitch of the teeth of one rack need not be identical with those of the other racks. Moreover, the teeth of the second rack could be in two sections in respective engagement with the second and third pinions, pitch spacing of the teeth in the two sections being respectively different.

The toothed racks may be mounted on rubber mountings.

DETAILED DESCRIPTION OF THE DRAWINGS

Figure 1:
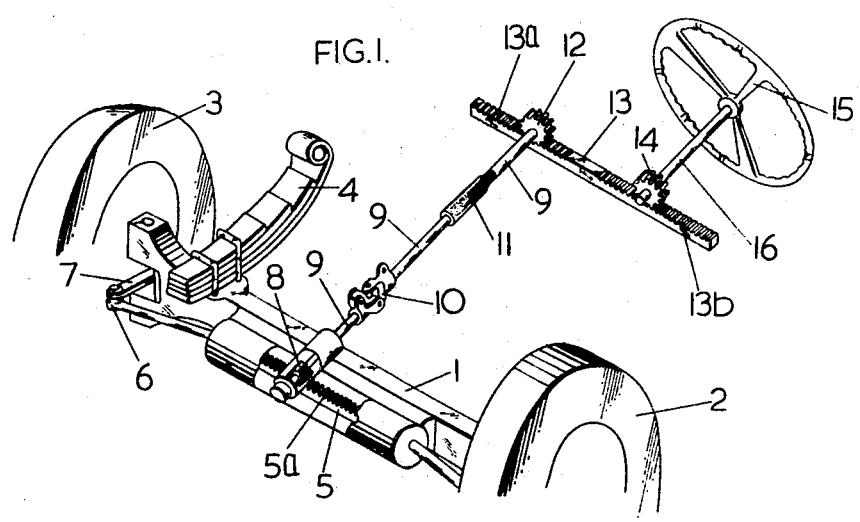
FIG. 1 is a diagrammatic perspective view of a steering mechanism according to the present invention fitted within a vehicle.
Figure 2:
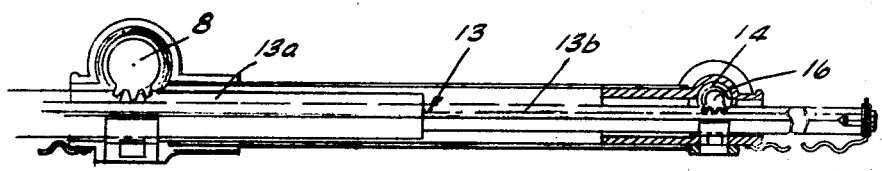
FIG. 2 is a part sectional more detailed elevational view of one form of the second toothed rack incorporated in the steering mechanism of FIG. 1.

Referring firstly to FIGS. 1 and 2 there is shown a motor vehicle, in this case a truck, having a rigid front beam axle 1 at the ends of which are mounted steerable road wheels 2 and 3. The axle is connected to a vehicle chassis (not shown) by longitudinally extending leaf springs 4, only one of which is shown.

A first toothed rack 5 is mounted, within a casing, directly on the axle 1 and parallel to it. The ends of the rack 5 are each connected via a link and ball joint (not shown) to the steerable wheels through a joint 6 and a steering arm 7. The casing housing the rack 5 may also constitute the cylinder of a hydraulic piston and cylinder power assistance unit, the piston being mounted on the rack 5. The teeth of the rack 5 are engaged by a first pinion 8 which is mounted for rotation within a casing on one end of a coupling shaft 9.

The coupling shaft 9, in this particular arrangement, is split into sections and incorporates a universal joint 10 and a sliding joint 11. Alternatively, the shaft may be split into a larger number of sections connected by a plurality of universal joints.

The other end of the coupling shaft 9 has a second pinion 12 mounted on it.

The second pinion 12 engages the teeth of a second rack 13 which, in this case, is parallel to the first rack.

A third pinion 14 also engages the teeth of the second rack 13.

The third pinion 14 is adapted to be rotated by an input member, in this case a steering wheel 15, which is connected to the pinion 14 by a steering column 16.

It is to be noted that the position of the universal joint 10 in relation to the spring eye or pivotal point of the forward or trailing link-type leaf spring suspension 4 is such as to possibly eliminate the need of a sliding joint such as 11. Alternatively, an elastomeric coupling could be employed instead of sliding joint 11 to take up any small axial movement generated by noncoincidence of coupling and suspension swing centers.

The second rack 13 need not be parallel to the first rack 5, i.e., horizontal, but could be substantially upright or at any desired angle in between.

Figure 4:
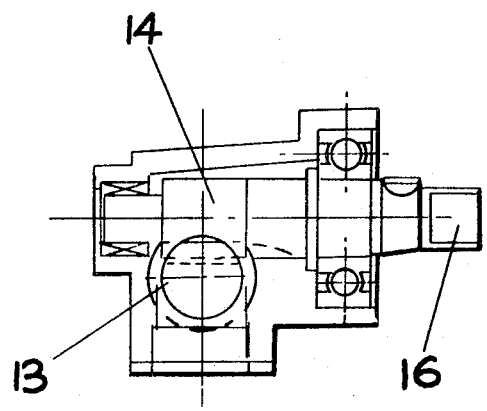
FIG. 4 is a view taken in the direction of the arrow B in FIG. 2.
Figure 3:
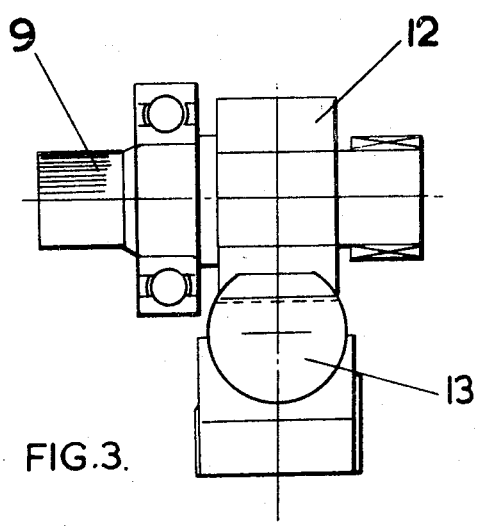
FIG. 3 is a view taken in the direction of the arrow A in FIG. 2.
Figure 5:
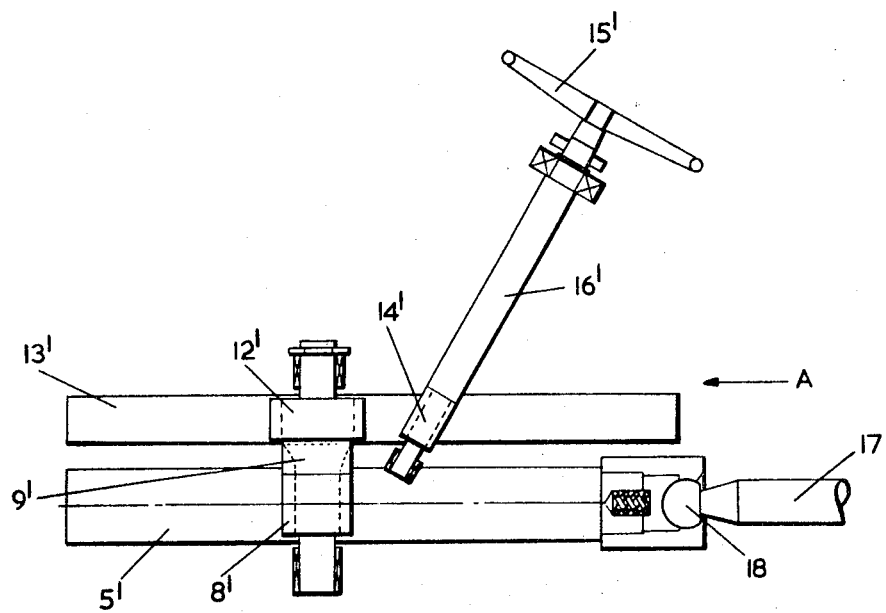
FIG. 5 is a diagrammatic elevational view of a modified arrangement in which the two toothed racks are disposed closely adjacent and a parallel to one another and the transmission comprises a short shaft and in which the first toothed rack is single ended in the sense that it is intended to be connected to only one pair of steerable ground wheels.
Figure 6:
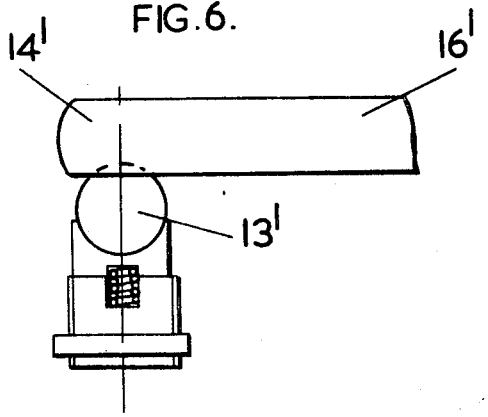
FIG. 6 is a detail view of part of the arrangement of FIG. 5.

FIG. 2 simply show the pinion 8 in engagement with the teeth 5a of the first toothed rack 5 and shown behind the first toothed rack, the second rack with its two sets of teeth 13a, 13b and the pinion 14 in engagement with the latter. FIGS. 4 and 5 simply shows a greater detail the casings, bearings and trunions respectively of the pinion 14 engaging the rack 13 and the pinion 12 engaging the rack 13.

FIG. 5 shows diagrammatically an arrangement similar to that of FIG. 1 in which the two racks are closer together and parallel. Thus, the first toothed rack $5^1$ is mounted, within a casing, directly on an axle (not shown) and parallel to it. One end only of the rack $5^1$ is connected via ball joint 18 and link 17 to one of two steerable wheels not shown. The wheels are connected together by a link (not shown). The casing housing the rack $5^1$ may also constitute the cylinder of a hydraulic piston and cylinder power assistance unit, the piston being mounted on the rack $5^1$. The teeth of the rack $5^1$ are engaged by a first pinion $8^1$ which is mounted for rotation within a casing on one end of a coupling shaft $9^1$. The other end of the coupling shaft $9^1$ has a second pinion $12^1$ mounted on it. The second pinion $12^1$ engages the teeth of a second rack $12^1$ which, in this case, is parallel to the first rack, and located very close to the first rack. Thus, in this case, the coupling shaft is extremely short in length and in one piece and does not include any universal or sliding joints. Moreover, in this case the third pinion $14^1$, in engagement with the second rack $13^1$, is of helical form thus, permitting the steering shaft $16^1$, carrying the steering wheel $15^1$ to be disposed at an inclination relatively to the racks $5^1$ and $13^1$.

Also the coupling shaft could be more elaborate and, in fact, comprise a plurality of shafts interconnected by a plurality of universal joints and following any desired path.

With the steering mechanism described and shown there are the following advantages:

a. the actual steering rack (5) can be mounted directly on the vehicle axle (1) and thus be connected almost directly to the steerable road wheels (2,3), thus eliminating or minimizing lack of response and wheel "fight" which occurs where the positioning of the rack necessitates a relatively complicated and long linkage to the road wheels:

b. the steering ratio obtainable with a conventional single rack was a limiting factor in the kind of vehicle to which rack and pinion steering could be applied: this limitation is avoided in the present invention since the pinion (12) of the second rack (13) and the ability to select the gear ratios of the second (12) and third (14) pinions means that any desired steering ratio can be provided:

c. the pinion (12) of the second rack (13) also means that there is greater freedom in the positioning of the steering wheel (15) within the drivers' compartment i.e., there is less of a packaging problem in fitting the steering arrangement with a particular vehicle.

Modifications may be made to the steering arrangements described and shown without departing from the essence of the present invention as described.

I claim:

1. A motor vehicle steering mechanism comprising: a first toothed rack having at least one of its ends adapted to be connected to two steerable road wheels of a motor vehicle; a first pinion engaging the teeth of said first rack; a second toothed rack; a second pinion engaging the teeth of said second toothed rack; a transmission connecting together said first and second pinions, and a third pinion engaging the teeth of said second toothed rack and mounted on an input member, whereby said first rack and steerable wheels are controlled from said input member.

2. A steering mechanism according to claim 1, wherein said first rack is mounted directly on a vehicle axle and parallel to it.

3. A steering mechanism according to claim 1, wherein said second rack lies substantially parallel to said first rack.

4. A steering mechanism according to claim 1, wherein said transmission is constituted by a coupling shaft upon the opposite ends of which said first and second pinions are mounted.

5. A steering mechanism according to claim 1, wherein said coupling shaft is split and includes a universal joint.

6. A steering mechanism according to claim 1, wherein said coupling shaft is split and includes a sliding joint.

7. A steering mechanism according to claim 1, wherein said third pinion has fewer teeth than said second pinion so as to increase the steering ratio of the steering mechanism.

8. A steering mechanism according to claim 1, which is fitted in a motor vehicle which has a rigid axle fitted with steerable road wheels at its ends, said first rack being mounted directly on the front axle.

9. A steering mechanism according to claim 1, further comprising power assistance means associated with said first rack.

10. A steering mechanism according to claim 1 which is fitted to a motor vehicle which has independent front suspension.

* * * * *